(12) United States Patent
Omori

(10) Patent No.: US 10,718,916 B2
(45) Date of Patent: Jul. 21, 2020

(54) FASTENING MEMBER AND OPTICAL RECEPTACLE MODULE

(71) Applicant: NICHIA CORPORATION, Anan-shi, Tokushima (JP)

(72) Inventor: Masaki Omori, Tokyo (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 16/230,789

(22) Filed: Dec. 21, 2018

(65) Prior Publication Data

US 2019/0196122 A1    Jun. 27, 2019

(30) Foreign Application Priority Data

Dec. 27, 2017  (JP) .................. 2017-250608
Dec. 13, 2018  (JP) .................. 2018-233246

(51) Int. Cl.
*G02B 6/36*  (2006.01)
*G02B 6/38*  (2006.01)
*G02B 6/00*  (2006.01)
*G02B 6/42*  (2006.01)

(52) U.S. Cl.
CPC ............ *G02B 6/4292* (2013.01); *G02B 6/389* (2013.01)

(58) Field of Classification Search
CPC .............................. G02B 6/4292; G02B 6/389
USPC ........ 385/56, 62, 65, 66, 81, 83, 87, 88, 92, 385/136, 139
See application file for complete search history.

(56) References Cited

U.S. PATENT DOCUMENTS

2010/0008630 A1*  1/2010  Marrapode .......... G02B 6/3897
                                              385/78
2014/0328559 A1   11/2014  Kobayashi et al.

FOREIGN PATENT DOCUMENTS

| JP | 2000-180669 A | 6/2000 |
| JP | 2001-525076 A | 12/2001 |
| JP | 2003-344716 A | 12/2003 |
| JP | 2008-102247 A | 5/2008 |
| JP | 2012-242658 A | 12/2012 |
| JP | 2014-219441 A | 11/2014 |
| WO | 9841889 A2 | 9/1998 |

* cited by examiner

*Primary Examiner* — Kaveh C Kianni
*Assistant Examiner* — Hung Q Lam
(74) *Attorney, Agent, or Firm* — Global IP Counselors, LLP

(57) ABSTRACT

A fastening member is configured to be removably attached to an optical fiber connector including a supporting member supporting an optical fiber and a flange part expanding outward in a radial direction. The fastening member includes a base portion and an engaging portion. The base portion defines a slit having a width smaller than a diameter of the flange part of the optical fiber connector and greater than a diameter of the supporting member of the optical fiber connector. The engaging portion extends from the base portion perpendicularly to the base portion. The engaging portion includes a spring portion at a tip portion of the engaging portion.

19 Claims, 9 Drawing Sheets

FASTENING MEMBER AND OPTICAL RECEPTACLE MODULE

CROSS-REFERENCE TO RELATED APPLICATIONS

This application claims priority to Japanese Patent Application No. 2017-250608 filed on Dec. 27, 2017 and Japanese Patent Application No. 2018-233246 filed on Dec. 13, 2018. The entire disclosures of Japanese Patent Application Nos. 2017-250608 2018-233246 are hereby incorporated herein by reference.

BACKGROUND

1. Technical Field

The present disclosure relates to a fastening member and an optical receptacle module.

2. Description of Related Art

A fastening member that couples an optical fiber and an optical receptacle together is required to perform reliable and stable fastening. For example, an optical receptacle including a guide member that positions a ferrule in the radial direction, and a plurality of springs configured to be engaged with the ferrule and apply force in the insert direction is proposed. The springs may be fixed to the guide member. Alternatively, a leaf spring may be fixed at the ferrule side (for example, see JP 2003-344716 A and JP 2000-180669 A).

SUMMARY

Meanwhile, a fastening member with a simple structure that are configured to perform secure fastening at a low cost is required. An object of certain embodiments of the present invention is to provide a fastening member that can securely fasten an optical receptacle and an optical fiber connector at a low cost with a simpler structure of the fastening member, and to provide an optical receptacle module fastened with the fastening member.

According to one embodiment of the present invention, a fastening member is configured to be removably attached to an optical fiber connector including a supporting member supporting an optical fiber and a flange part expanding outward in a radial direction. The fastening member includes a base portion and an engaging portion. The base portion defines a slit having a width smaller than a diameter of the flange part of the optical fiber connector and greater than a diameter of the supporting member of the optical fiber connector. The engaging portion extends from the base portion perpendicularly to the base portion. The engaging portion includes a spring portion at a tip portion of the engaging portion.

According to another embodiment of the present invention, an optical receptacle module includes an optical fiber, an optical receptacle and a fastening member. The optical fiber connector includes a supporting member supporting an optical fiber, and a flange part spreading outward in a radial direction. The optical receptacle includes a laser package, a holding member holding the laser package, and a fiber holding member disposed on an end portion of the holding member and including an outer lateral surface defining a recess. The fastening member is removably attached to the optical fiber connector and the optical receptacle to fasten the optical fiber connector and the optical receptacle together. The fastening member includes a base portion and an engaging portion. The base portion defines a slit having a width smaller than a diameter of the flange part of the optical fiber connector and greater than a diameter of the supporting member of the optical fiber connector such that the supporting member of the optical fiber connector is inserted into the slit and a first surface of the flange part is pressed against the base portion. The engaging portion extends from the base portion perpendicularly to the base portion, and includes a spring portion at a tip portion of the engaging portion with the spring portion abutting on the recess of the fiber holding member of the optical receptacle to fasten the fastening member to the optical receptacle.

The fastening member according to certain embodiments of the present invention can fasten the optical receptacle and the optical fiber connector surely at a low cost with its simpler structure.

Further, the optical receptacle module according to certain embodiments of the present invention can securely easily and fasten the optical receptacle and the optical fiber connector with a simple structure of the fastening member. Thus, inexpensive and high-quality optical receptacle module can be obtained.

DETAILED DESCRIPTION OF EMBODIMENT

Figure 1A:
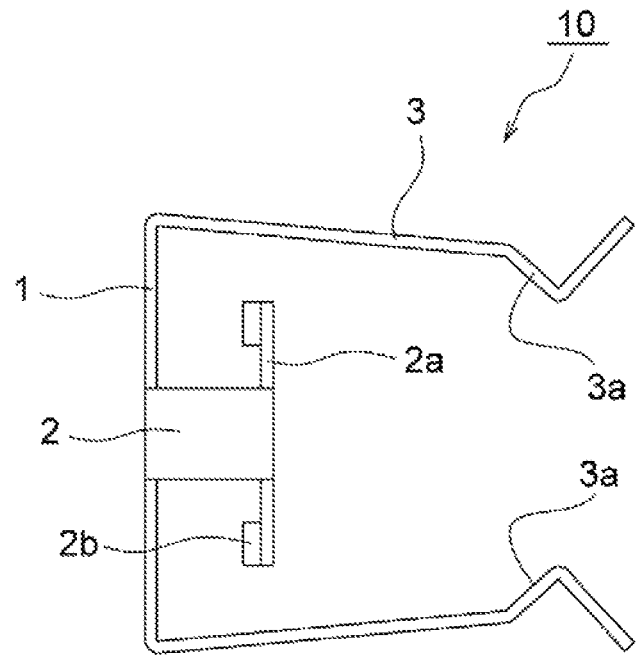
FIG. 1A is a side view of a fastening member according to a first embodiment.

The embodiments shown below are illustrative for giving a concrete form to the technical idea of the present invention, and the present invention is not limited to the description below. Further, the size, positional relationship and the like of members shown in the drawings may be exaggerated for the sake of clarity. Still further, an identical name or reference numeral basically denotes an identical or similar member, and a repetitive description will be omitted as appropriate.

Fastening Member

Figure 1B:
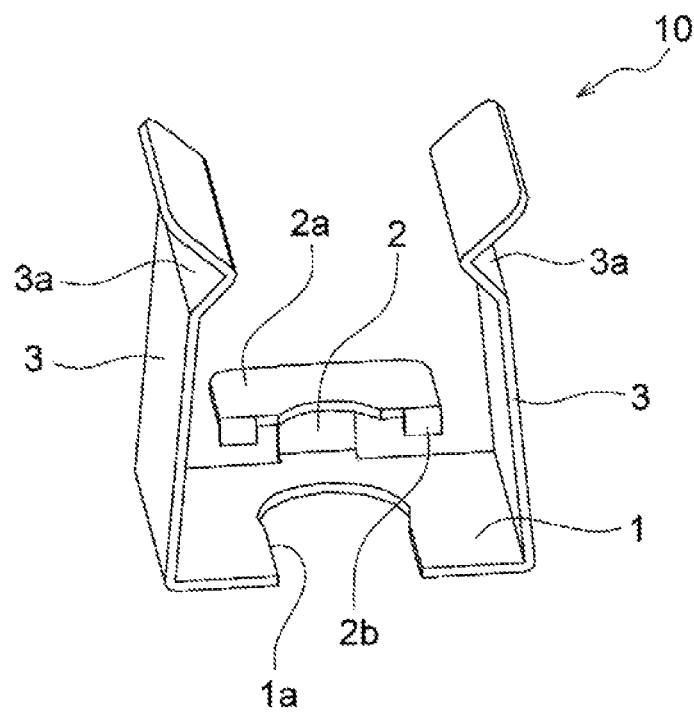
FIG. 1B is a schematic perspective view of the fastening member shown in FIG. 1A.
Figure 1C:
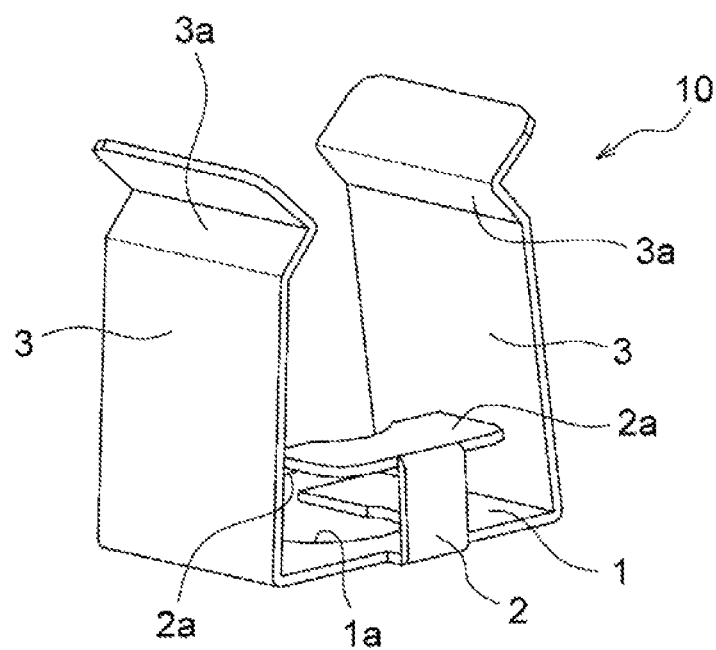
FIG. 1C is a schematic perspective view of the fastening member shown in FIG. 1A viewed from another angle.

As shown in FIGS. 1A, 1B, and 1C, a fastening member 10 according to one embodiment of the present disclosure includes a basal portion 1 and engaging portions 3, each of which has a spring portions at a tip portion thereof. The fastening member 10 can be removably attached to, for example, an optical fiber connector which includes a flange part expanding outward in the radial direction.

With such a simple structure that allows removable attachment, at a low cost, the fastening member 10 can securely and easily fasten, for example, an optical fiber connector to various members such as, representatively, an optical receptacle or another optical fiber.

Base Portion 1

The base portion 1 is configured to support an optical fiber connector, and may be a plate-like member. Further, it is preferable that the base portion 1 is partially flat. The base portion 1 has a strength that allows for maintaining the fastening. The substantial shape of the base portion 1 as seen in a plan view may be any of various shapes such as a polygon such as a triangle, a quadrangle or the like, or a circle or an oval or the like. In FIG. 1B, an approximate shape of the base portion 1 is a substantially quadrangular shape.

The base portion 1 includes a slit 1a that extends from one end of the base portion 1 toward another end thereof at its opposite side. The slit 1a has a length shorter than that of the base portion 1. The slit 1a has a width, for example, preferably smaller than the diameter of the flange part of the optical fiber connector to which the fastening member is attached, while greater than the diameter of the supporting member of the optical fiber connector. The slit with such a width allows the base portion 1 to be attached to the optical fiber connector. Further, engaging the fastening member and the optical fiber connector allows the flange part of the optical fiber connector to be engaged with the slit.

Engaging Portion 3

Each engaging portion 3 is a portion that extends from the base portion 1 perpendicularly to the base portion 1. The expression "extend perpendicularly" refers to not only that the engaging portion 3 extends perpendicularly to the base portion 1, but also refers to that, when the fastening member 10 is attached to the optical fiber connector, the engaging portion 3 extends toward the tip portion of the optical fiber connector starting from the end of the base portion 1. More specifically, the engaging portion 3 may extend so as to cross the base portion 1 at an angle of 90±20 degrees. In particular, the engaging portion 3 preferably extends as being slightly inclined so as to reduce the crossing angle relative to the base portion 1. Thus, the inward fastening force in the engaging portions 3 can be increased.

In FIG. 1B, each engaging portion 3 extends from the base portion 1 so as to cross the base portion 1 at an angle of 85 degrees.

The spring portion 3a is disposed at a tip portion of each engaging portion 3. The spring portion 3a is preferably inclined more greatly than the engaging portion 3 so as to exhibit function of a leaf spring is exhibited. This allows the inward fastening force of the engaging portions 3 to be further strongly exhibited. The spring portion 3a defines, for example, the crossing angle with respect to the base portion 1 smaller than 90 degrees, preferably smaller than 80 degrees, and more preferably smaller than 70 degrees.

A length of each engaging portion 3 may be slightly shorter than, or equal to, the tip portion of the optical fiber connector when the optical fiber connector is inserted into the slit. For example, the engaging portion 3 preferably has a length that allows, when the optical fiber connector is attached to another member such as the optical receptacle, the engaging portions 3, particularly the spring portions 3a of the engaging portions 3, to engage with a portion of the optical receptacle. Each engaging portion 3 may have a width equivalent to, or greater or smaller than a width of the base portion 1. For ease of processing, a width of each engaging portion 3 is substantially equivalent to a width of the base portion 1.

The tip portion of each spring portion 3a is preferably bent outward so as to facilitate engagement with the optical receptacle. The degree of bending can be selected as appropriate.

In FIG. 1A, each spring portion 3a is bent inward from the tip portion of corresponding one of the engaging portions 3 so as to cross the base portion 1 at an angle of 30 degrees. Further, the tip of each spring portion 3a is bent outward so as to cross the spring portion 3a at an angle of 90±20 degrees. As used herein, a direction toward a side at which the attached optical fiber connector is housed is referred to as "inward", and a direction opposite thereto is referred to as "outward".

A length and width of each spring portion 3a can be selected as appropriate according to a shape or the like of the optical fiber connector to be used.

Figure 2A:
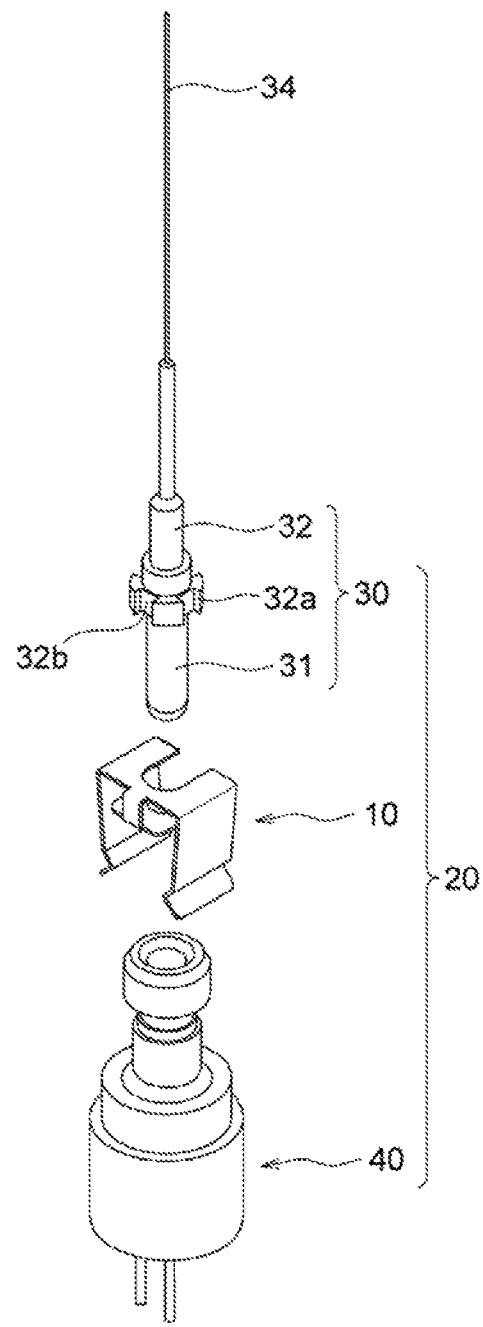
FIG. 2A is an exploded perspective view of an optical receptacle module according to the first embodiment.
Figure 2B:
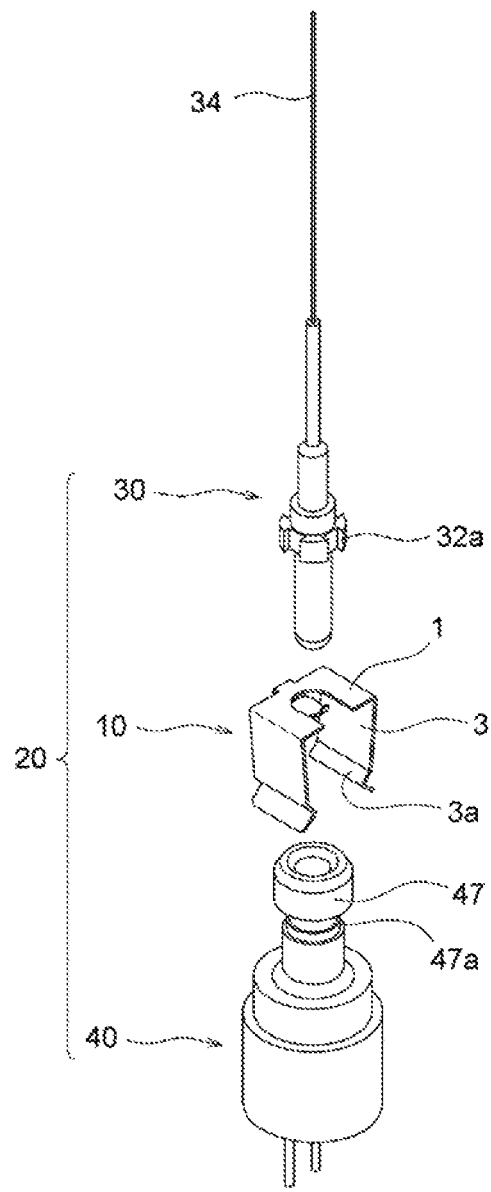
FIG. 2B is an exploded perspective view of the optical receptacle module shown in FIG. 2A viewed from other angle.
Figure 2C:
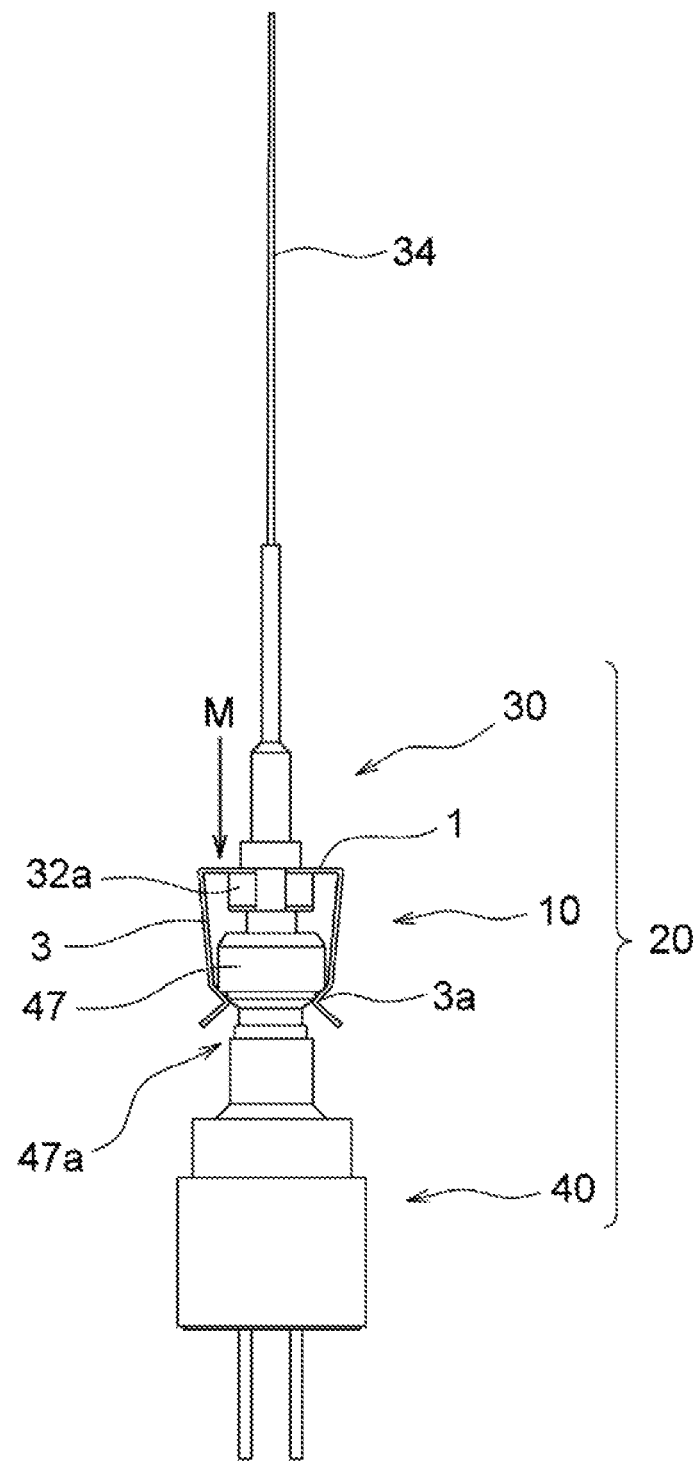
FIG. 2C is a schematic perspective view showing the fastened state of the optical receptacle module shown in FIG. 2B.
Figure 2D:
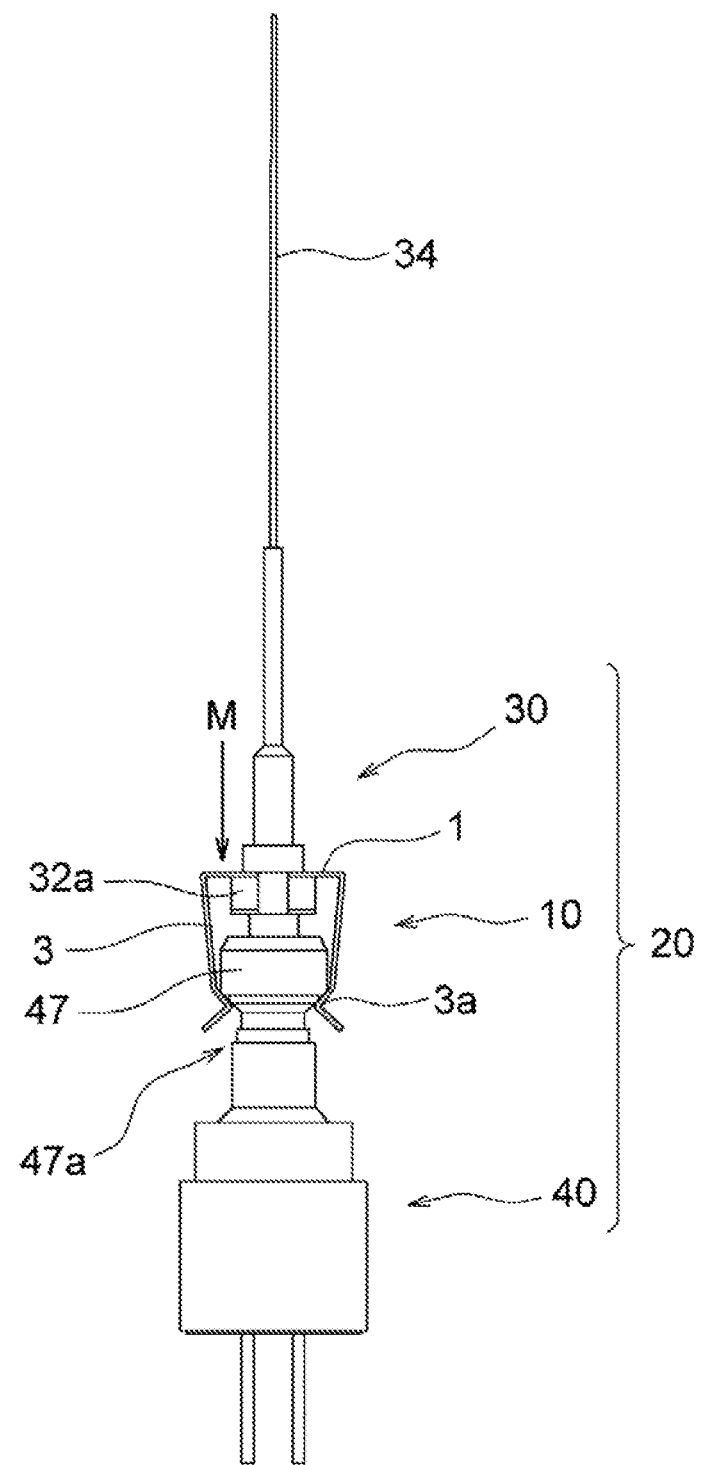
FIG. 2D is a side view showing the fastened state of the optical receptacle module shown in FIG. 2C.

With such spring portions 3a, the fastening member 10 can strongly fasten the optical fiber connector and the optical receptacle (see FIGS. 2C, 2D).

A single engaging portion 3 may extend from the base portion 1, or two or three or more engaging portions 3 may be provided. A pair of engaging portions 3 are preferably provided. The pair of engaging portions 3 are further preferably disposed so as to face each other.

In FIG. 1B, the approximate shape of the base portion 1 is a substantially quadrangular shape. The slit 1a is defined at a first side of the base portion 1, and each of a pair of engaging portions 3 extends from a respective one of second and third sides, between which the slit 1a is located, of the base portion 1.

Claw Portion 2 for Fixing Optical Fiber Connector

The fastening member 10 preferably includes a claw portion 2 for fixing an optical fiber connector. The claw portion 2 is the site that extends from the base portion 1 perpendicularly to the base portion 1. As used herein, to extend perpendicularly is not limited to an arrangement in which the claw portion 2 is precisely perpendicular to the base portion 1, but also means that, for example, the claw portion 2 extends so as to cross the base portion 1 at an angle of 90±20 degrees.

In FIG. 1B, the claw portion 2 extends substantially perpendicularly to the base portion 1.

Such a claw portion 2 can support the flange part of the optical fiber connector, as described below (see FIGS. 2C, 2D). The claw portion 2 is preferably disposed, on the base portion 1, on other end side opposing to one end where the slit 1a is provided. Thus, without hindering insertion of the optical fiber connector through the slit 1a, the fastening member 10 can support the optical fiber connector inserted into the slit 1a.

The length and width of the claw portion 2 can be selected as appropriate according to the shape or the like of the optical fiber connector to be used.

It is preferable that the claw portion 2 extends perpendicularly to the base portion 1, and further a bent portion 2a, which is bent parallel to the base portion 1, is disposed at a tip portion of the claw portion 2 opposite to another tip portion thereof at a base portion 1 side. As used herein, the expression "bent parallel" and "bent to extend parallel" encompass not only that the bent portion 2a is bent precisely parallel to the base portion 1, but also encompasses that, for example, the bent portion 2a is bent so as to form an angle of 20 degrees with respect to the planar direction of the base portion 1. Further, it also refers to that the bent portion 2a is bent so as to cross the claw portion 2 at an angle of 90±20 degrees.

In FIG. 1B, the bent portion 2a extends substantially perpendicularly to the claw portion 2, and is bent substantially parallel to the base portion 1.

The bent portion 2a is preferably wider than the claw portion 2, and preferably wider than the diameter of the supported optical fiber connector.

With such a width, the bent portion 2a can, as described below, hold the flange part of the optical fiber connector against the base portion 1 from its opposite side over a wide area and thus support the flange part of the optical fiber connector (see FIGS. 2C, 2D)).

Further, a hook part 2b may be disposed at a part of a tip portion of the bent portion 2a. The hook part 2b preferably extends perpendicularly to the bent portion 2a. The expression "extend perpendicularly" is not limited to an arrangement in which the hook part 2b is precisely perpendicular to the bent portion 2a.

More specifically, it also encompasses that the hook part 2b extends to cross the bent portion 2a at an angle of 90±20 degrees. The hook part 2b is preferably disposed on each of opposite sides of one side being an end of the bent portion 2a. In the case where surfaces of the flange part of the optical fiber connector define recesses, the recesses can be engaged with the hook parts, so that the fastening member 10 can strongly fasten the optical fiber connector (see FIG. 2E).

The claw portion 2 is preferably disposed, in the base portion 1, adjacent to the pair of engaging portions 3. This arrangement allows the fastening member 10 to stably support the optical fiber connector, and to removably and firmly fasten the optical fiber connector and the optical receptacle.

In FIG. 1B, in the base portion 1 with a substantially quadrangular approximate shape, the slit 1a of the base portion 1 is defined in the first side of the base portion, and each of the pair of engaging portions 3 extends from a respective one of the second and third sides of the base portion between which the first side is disposed.

Further, the claw portion 2 extends from a fourth side, which is adjacent to the second and third sides from which the pair of engaging portions 3 extend, of the base portion 1.

Optical Receptacle Module 20

As shown in FIGS. 2A to 2E, an optical receptacle module 20 according to one embodiment includes an optical fiber connector 30, the above-described fastening member 10, and an optical receptacle 40. The optical fiber connector 30 and the optical receptacle 40 are fastened with the fastening member 10, and thus optically coupled to each other.

In this arrangement, the fastening member 10 is removably attached to the optical fiber connector 30 and the optical receptacle 40.

Thus, a high-performance optical receptacle module with a simple shape that can be easily attached and can perform securer fastening can be obtained at a low cost.

Optical Fiber Connector 30

As shown in FIG. 2A, the optical fiber connector 30 includes a ferrule 31, a supporting member 32, and a flange part 32a expanding outward in the radial direction at one end portion of the supporting member 32.

The ferrule 31 is configured to allow the optical fiber 34 to be inserted from a first end portion of the ferrule 31. A second end portion of the ferrule 31 opposite to the first end portion thereof has an outer periphery that is covered and supported by the supporting member 32. Any known ferrule may be used for the ferrule 31.

The supporting member 32 functions to support the ferrule 31, and has a portion into which the ferrule 31 can be inserted. The supporting member 32 may have a constant diameter, or may be partially varied in diameter. The supporting member 32 includes, at the second end portion where the ferrule 31 is supported, the flange part 32a expanding outward in the radial direction.

The flange part 32a may have a ring-like shape with a diameter greater than a diameter of a portion covering the ferrule 31.

Alternatively, for example, at a portion of the flange part 32a, at least one recess 32b may be defined at a surface thereof, or at least one recess 32b recessed in the radial direction may be defined. The supporting member 32, or the supporting member 32 and the flange part 32a may be made of a single member, or may be made of a combination of a plurality of members to be integrated with each other.

Optical Receptacle 40

Figure 2E:
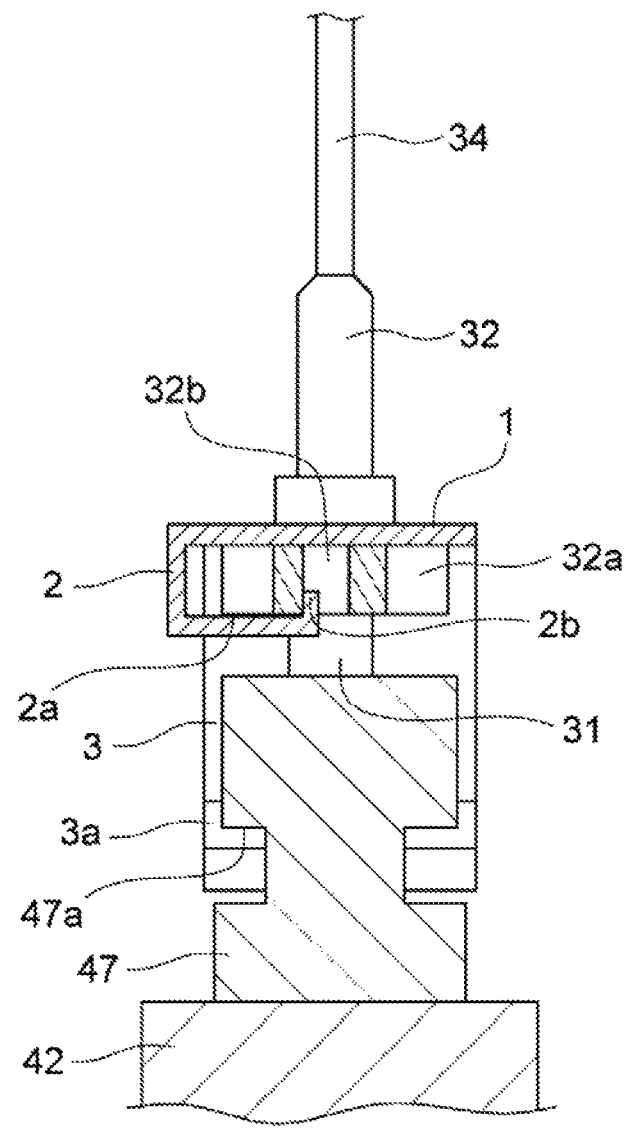
FIG. 2E is an enlarged cross-sectional view around the fastening member taken along an arrow M in FIG. 2D.
Figure 3:
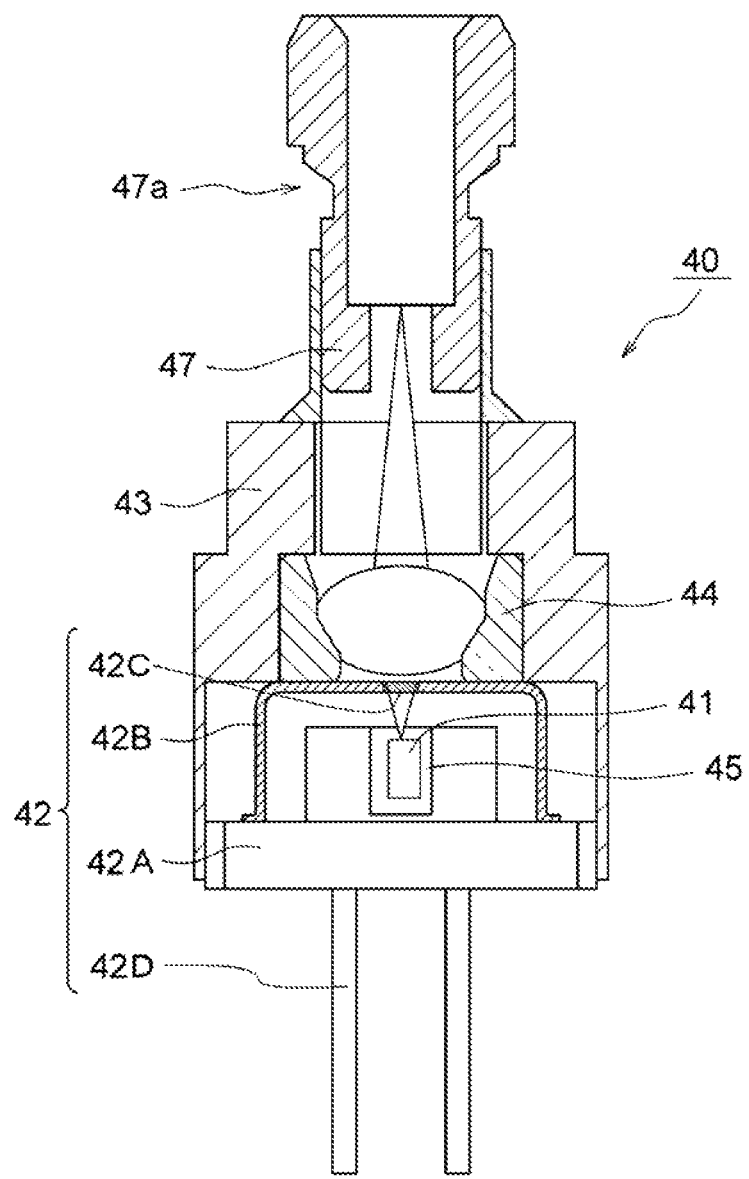
FIG. 3 is a schematic cross-sectional view showing an optical receptacle of the optical receptacle module shown in FIG. 2A.

The optical receptacle 40 shown in FIGS. 2A to 2E includes, for example, as shown in FIG. 3, a laser package 42, a holding member 43 that holds the laser package 42, and a fiber holding member 47. Further, a lens 44 with a barrel may be disposed at a light emission surface side of the laser package 42.

The laser package 42 houses a laser element 41. The laser element 41 may have any peak wavelength between the ultraviolet region to the infrared region.

For example, the peak emission wavelength of the laser element 41 may be in a range of 300 nm to 500 nm. The laser package 42 is preferably held by the holding member 43. The laser package 42 may be, for example a can package constituted of a plurality of members including a base part 42A, a cap 42B with a window 42C, leads 42D and the like.

At the upper surface of the base part 42A, a submount 45 is provided on a post which is a columnar member extending upward from the upper surface of the base part 42A.

Generally, the laser element 41 is fixed to the submount 45 using a die-bond member such as Au—Sn, Ag paste, In alloy or the like.

A plurality of the leads 42D is disposed to penetrate through the base part 42A from the upper surface side to the bottom surface side of the base part 42A.

The leads 42D are fixed via an insulating member, and electrically connected to an external power supply.

The cap 42B, which is hollow, is bonded near the edge of the base part 42A at the upper surface side of the base part 42A so as to cover the laser element 41. The window 42C penetrating in the thickness direction for extracting light is provided through the upper surface of the cap 42B, at a portion facing the laser element 41.

The holding member 43 is a cylindrical member that holds and houses the laser package 42. The holding member 43 may be constituted of a single member, or a combination of two or more members.

Figure 2F:
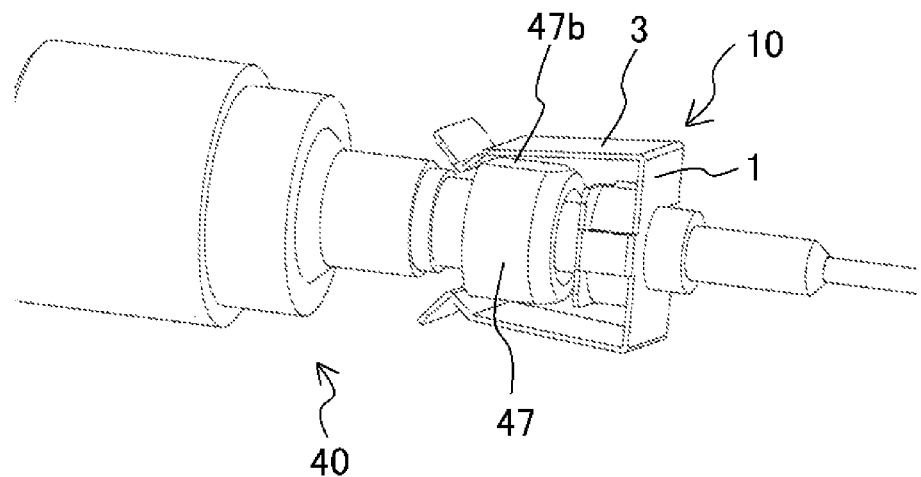
FIG. 2F is an enlarged perspective view of a region in the vicinity of the fastening member showing an example of a configuration of outer peripheral lateral surfaces of a fiber holding member.
Figure 2G:
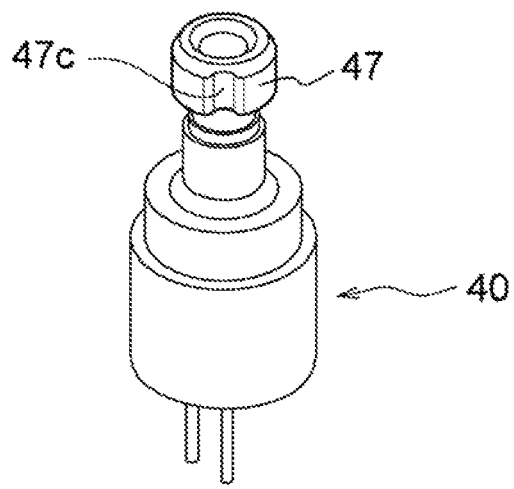
FIG. 2(G is a simplified perspective view showing another example of the configuration for the outer peripheral lateral surfaces of the fiber holding member.

Further, the fiber holding member 47 is disposed above the holding member 43 in order to guide the light emitted from the holding member 43 without blocking the light, and to perform fastening to the fastening member 10. The fiber holding member 47 preferably has an outer shape in which one or a plurality of recesses 47a is defined by the outer peripheral lateral surfaces of the fiber holding member 47 recessed in the axial direction of the fiber holding member 47. In addition, a part of the outer peripheral lateral surfaces of the fiber holding member 47 preferably defines flat faces 47b as shown in FIG. 2F, or one or more grooves 47c as shown in FIG. 2G, extending parallel to the axial direction at locations that contact the fastening member 10. Such irregular shapes allow the fiber holding member 47 and the fastening member 10 to be engaged with each other, and allow the fastening between the fastening member 10 and the optical fiber connector 30 to be firm. Especially, by providing the flat faces 47b or the groove 47c on the outer peripheral lateral surfaces of the fiber holding member 47, rotation of the optical receptacle 40 within the fastening member 10 can be suppressed or prevented.

The fiber holding member 47 may be constituted of a single member, or a combination of two or more members.

Each of the base part 42A, the cap 42B, the holding member 43, and the fiber holding member 47 are preferably made of a material having a high reflectance and a high heat dissipation performance. For example, a metal such as Cu, W, Ta, Mo, Al, Fe, Ag, Au, Rh, Kovar, brass, CuW, CuMo or the like may be used for each of the base part 42A, the cap 42B, the holding member 43, and the fiber holding member 47. These metals may be employed as a base member, and plating with Au, Ag, Al or the like may be performed on a portion or an entirety of a surface the base member. Among these, copper or copper alloy having a surface one plating with gold is performed may be used.

Fastening with Fastening Member 10

The optical fiber connector 30 and the optical receptacle 40 are removably fastened with the fastening member 10. In this case, for example, as shown in FIGS. 2C, 2D, and 2E, the ferrule 31 of the optical fiber connector 30 is inserted into the fiber holding member 47 of the optical receptacle 40, and is pressed toward the optical receptacle 40 side.

The slit 1a in the fastening member 10 of the base portion 1 is set at the optical fiber 34 side of the flange part 32a of the optical fiber connector 30. With the slit 1a having a width smaller than the diameter of the flange part 32a and greater than the diameter of the supporting member 32 of the optical fiber connector in a plan view, the base portion 1 abuts on a surface of the flange part 32a at the optical fiber 34 side, toward the ferrule 31 side, that is, toward the optical receptacle 40 side.

Further, the pair of engaging portions 3 of the fastening member 10 is disposed so that the fiber holding member 47, which guides the ferrule 31 therein and holding the ferrule 31, is disposed between the pair of engaging portions 3. The spring portions 3a are brought into contact with the recess 47a of the fiber holding member 47 and presses inward. Thus, the engaging portions 3 holds the fiber holding member 47 and draw the fiber holding member 47 toward the optical fiber connector 30 side.

In the case where the fastening member 10 has the claw portion 2 for fixing the optical fiber connector, the flange part 32a of the supporting member 32 disposed inward of the fastening member 10 is supported by the claw portion 2, and a surface of the flange part 32a on the ferrule 31 side is engaged with the bent portion 2a of the claw portion 2. That is, front and back surfaces of the flange part 32a is held by the bent portion 2a and the base portion 1 of the fastening member 10, and thus fixing is performed.

Further, as has been described above, in the case where the recess 32b is defined by the flange part 32a, as shown in FIG. 2E, the hook parts 2b at the tip portions of the bent portion 2a of the fastening member 10 are engaged with the recess 32b of the flange part 32a.

Thus, the fastening member 10 is fixed to the optical fiber connector 30 more firmly.

In other words, the supporting member 32 of the optical fiber connector 30 is inserted into the slit 1a, and the surface of the flange part 32a on the optical receptacle side is pressed against the base portion 1, so that the fastening member 10 is fastened to the optical fiber connector 30. Further, the spring portions 3a of the fastening member 10 abut on the recess 47a of the fiber holding member 47, so that the fastening member is fastened to the optical receptacle.

That is, the supporting member 32 of the optical fiber connector 30 is inserted into the slit 1a of the fastening member 10. At the same time, spreading the spring portions 3a of the fastening member 10, the optical receptacle 40 is inserted between the spring portions 3a so as to be parallel to the base portion 1. Thus, the fastening member 10 can be easily attached to the optical fiber connector 30 and the optical receptacle 40.

On the other hand, in the state where the optical fiber connector 30 and the optical receptacle 40 are fastened with the fastening member 10, the optical fiber connector 30 and the optical receptacle 40 are removed parallel to the base portion 1 from the opening of the slit 1a of the fastening member 10. Thus, the optical fiber connector 30 and the optical receptacle 40 can be easily removed.

Further, the fastening member 10 has a simple structure, so that the fastening member 10 is manufactured at a low cost. Still further, the various components of the fastening member 10, representatively, the optical fiber connector and the optical receptacle, can be fastened securely and firmly.

The light emitting device of the present disclosure can be preferably used for various display devices, an illumination device, a backlight light source of a liquid crystal display device, an image reading device in a copier, a scanner and the like, a projector device, a laser display device, an endoscope, a vehicular headlight, a barcode scanner and the like.

What is claimed is:

1. A fastening member configured to be removably attached to an optical fiber connector including a supporting member supporting an optical fiber and a flange part expanding outward in a radial direction, the fastening member comprising:
   a base portion defining a slit having a width smaller than a diameter of the flange part of the optical fiber connector and greater than a diameter of the supporting member of the optical fiber connector; and
   a pair of engaging portions extending respectively from opposing sides of the base portion perpendicularly to the base portion, the engaging portions including spring portions at distal ends of the engaging portions with the spring portions being spaced apart from each other.

2. The fastening member according to claim 1, further comprising
a claw portion extending from the base portion perpendicularly to the base portion, and
a bent portion that is bent from a tip portion of the claw portion to extend parallel to the base portion, the bent portion being configured to support the flange part of the optical fiber connector to fasten the fastening member to the optical fiber connector.

3. The fastening member according to claim 2, further comprising
a hook part arranged at a part of a tip portion of the bent portion.

4. The fastening member according to claim 1, wherein the claw portion is disposed between the engaging portions.

5. An optical receptacle module comprising:
an optical fiber connector including
a supporting member supporting an optical fiber, and
a flange part spreading outward in a radial direction;
an optical receptacle including
a laser package,
a holding member holding the laser package, and
a fiber holding member disposed on an end portion of the holding member and including an outer lateral surface defining a recess; and
a fastening member removably attached to the optical fiber connector and the optical receptacle to fasten the optical fiber connector and the optical receptacle together, the fastening member including
a base portion defining a slit having a width smaller than a diameter of the flange part of the optical fiber connector and greater than a diameter of the supporting member of the optical fiber connector such that the supporting member of the optical fiber connector is inserted into the slit and a first surface of the flange part is in direct contact with and pressed against a portion of the base portion adjacent to the slit, and
an engaging portion extending from the base portion perpendicularly to the base portion, and including a spring portion at a tip portion of the engaging portion with the spring portion abutting on the recess of the fiber holding member of the optical receptacle to fasten the fastening member to the optical receptacle.

6. The optical receptacle module according to claim 5, wherein
the fastening member further includes
a claw portion extending from the base portion perpendicularly to the base portion, and
a bent portion that is bent from a tip portion of the claw portion to extend parallel to the base portion, the bent portion pressing a second surface of the flange part so that the fastening member fastens the flange part of the optical fiber connector between the base portion and the bent portion.

7. The optical receptacle module according to claim 6, wherein
the fastening member further includes a hook part at a part of a tip portion of the bent portion,
a recess is defined by at least the second surface of the flange part of the optical fiber connector, and
the hook part is engaged with the recess in the flange part.

8. The fastening member according to claim 1, wherein
the slit of the base portion is opened at a first side of the base portion, and
the engaging portions defines a pair of opposing surfaces extending respectively from a second side and a third side of the base portion opposing each other with the first side being interposed between the second side and the third side.

9. The fastening member according to claim 1, wherein
the slit of the base portion is opened at one side of the base portion with the width of the slit being smaller than the diameter of the flange part of the optical fiber connector and greater than the diameter of the supporting member of the optical fiber connector throughout a majority of a length of the slit along a direction intersecting the one side of the base portion.

10. The fastening member according to claim 1, wherein
each of the engaging portions includes a bent section disposed between a connecting end of the engaging portion connected to the base portion and the distal end of the engaging portion, and each of the engaging portions being configured to be in contact with an optical receptacle in an area between the connecting end and the bent section to fix the optical fiber connector to the optical receptacle.

11. The fastening member according to claim 10, wherein
the distal end of each of the engaging portions extends outwardly from the bent section.

12. The fastening member according to claim 10, wherein
each of the engaging portions further includes an additional bent section between the bent section and the connecting end, and each of the engaging portions being configured to be in contact with the optical receptacle in the area between the additional bent section and the bent section.

13. The fastening member according to claim 8, wherein
each of the opposing surfaces of the engaging portions extends parallel to a direction intersecting the first side of the base portion.

14. The fastening member according to claim 8, wherein
each of the opposing surfaces of the engaging portions has a maximum width measured along an extending direction of the second side or the third side that is larger than a maximum length of the slit measured along the extending direction.

15. An optical receptacle module comprising:
the fastening member according to claim 1;
the optical fiber connector including
the supporting member supporting the optical fiber, and
the flange part spreading outward in the radial direction; and
an optical receptacle including
a laser package,
a holding member holding the laser package, and
a fiber holding member disposed on an end portion of the holding member and including an outer lateral surface defining a recess, wherein
the supporting member of the optical fiber connector is inserted into the slit of the fastening member,
a first surface of the flange part of the optical fiber connector is pressed against the base portion of the fastening member, and
the spring portions of the fastening member abut on the recess of the fiber holding member of the optical receptacle to fasten the optical fiber connector and the optical receptacle together.

16. The optical receptacle module according to claim 15, wherein
the fastening member further includes
a claw portion extending from the base portion perpendicularly to the base portion, and
a bent portion that is bent from a tip portion of the claw portion to extend parallel to the base portion, the bent portion pressing a second surface of the flange part so that the fastening member fastens the flange part of the optical fiber connector between the base portion and the bent portion.

17. The optical receptacle module according to claim 16, wherein
the fastening member further includes a hook part at a part of a tip portion of the bent portion,
a recess is defined by at least the second surface of the flange part of the optical fiber connector, and
the hook part is engaged with the recess in the flange part.

18. The fastening member according to claim 15, wherein
the slit of the base portion is opened at a first side of the base portion, and
the engaging portions defines a pair of opposing surfaces extending respectively from a second side and a third side of the base portion opposing each other with the first side being interposed between the second side and the third side.

19. The fastening member according to claim 15, wherein
the slit of the base portion is opened at one side of the base portion with the width of the slit being smaller than the diameter of the flange part of the optical fiber connector and greater than the diameter of the supporting member of the optical fiber connector throughout a majority of a length of the slit along a direction intersecting the one side of the base portion.

* * * * *